(12) United States Patent
Meynants

(10) Patent No.: US 8,259,199 B2
(45) Date of Patent: Sep. 4, 2012

(54) PIXEL ARRAY WITH REDUCED SENSITIVITY TO DEFECTS

(75) Inventor: Guy Meynants, Retie (BE)

(73) Assignee: CMOSIS NV, Antwerp (BE)

( * ) Notice: Subject to any disclaimer, the term of this patent is extended or adjusted under 35 U.S.C. 154(b) by 1034 days.

(21) Appl. No.: 12/222,545

(22) Filed: Aug. 12, 2008

(65) Prior Publication Data

US 2009/0160752 A1    Jun. 25, 2009

(30) Foreign Application Priority Data

Dec. 21, 2007  (GB) .................................. 0724983.2

(51) Int. Cl.
*H04N 9/64* (2006.01)
(52) U.S. Cl. ........................................ 348/247; 348/308
(58) Field of Classification Search .................. 348/246, 348/247, 248, 251, 293, 294, 296, 304, 306, 348/308; 382/149, 150; 257/159, 291, 292, 257/300, 446, 500, 530, 544
See application file for complete search history.

(56) References Cited

U.S. PATENT DOCUMENTS

| | | | | |
|---|---|---|---|---|
| 5,541,402 | A * | 7/1996 | Ackland et al. ............. | 250/208.1 |
| 6,118,482 | A * | 9/2000 | Clark et al. .................... | 348/308 |
| 6,218,656 | B1 * | 4/2001 | Guidash ..................... | 250/208.1 |
| 6,320,616 | B1 * | 11/2001 | Sauer ............................. | 348/241 |
| 6,366,312 | B1 * | 4/2002 | Crittenden ..................... | 348/187 |
| 6,489,798 | B1 * | 12/2002 | Scott-Thomas et al. . . | 324/762.01 |
| 6,498,831 | B2 * | 12/2002 | Granfors et al. ............. | 378/98.8 |
| 2003/0151686 | A1 * | 8/2003 | Koyama ........................ | 348/304 |
| 2004/0032983 | A1 | 2/2004 | Strohbehn et al. | |
| 2005/0051775 | A1 * | 3/2005 | Meynants ........................ | 257/72 |
| 2007/0024726 | A1 * | 2/2007 | Nomoto et al. ................ | 348/308 |

OTHER PUBLICATIONS

"Search Report of U K I P O regarding UK application GB 0724983. 2, Apr. 11, 2008".

* cited by examiner

*Primary Examiner* — Aung S Moe
*Assistant Examiner* — Chriss Yoder, III
(74) *Attorney, Agent, or Firm* — Bacon & Thomas, PLLC

(57) ABSTRACT

An array of active pixels comprises rows of pixels and row select lines for selecting rows of pixels. Each active pixel comprises a buffer amplifier for buffering an output of a photo-sensitive element. An output of the buffer amplifier can be selectively put into a high impedance state, by control of the input of the buffer amplifier, when there is a defect in the row select line for that pixel. This allows other rows, which are defect-free, to remain operating as normal. A disable line can be provided for a row of pixels and each pixel can have a switch connected to the disable line. Alternatively, a first supply line powers a row of pixels. Each pixel comprises a reset switch connected between a photo-sensitive element and the first supply line for resetting the photo-sensitive element. The array is configured such that, in the event of a defect in a row select line, the first supply line is set to ground, or a low voltage, and the reset switch is turned on to put the buffer amplifier into the high impedance state.

17 Claims, 4 Drawing Sheets

PIXEL ARRAY WITH REDUCED SENSITIVITY TO DEFECTS

FIELD OF THE INVENTION

This invention relates to semiconductor pixel arrays for use in image sensors.

BACKGROUND TO THE INVENTION

It is known to manufacture image sensors using CCD technology or CMOS technology. One advantage of CMOS technology is that it allows additional devices to be fabricated directly alongside a photodiode on a semiconductor wafer. A conventional three transistor (3T) Active Pixel Sensor (APS), or active pixel, is shown in FIG. 1. A reset transistor M1 initialises the cathode of a photodiode 11 to a known voltage at the beginning of an image capture. After a reset, radiation incident on the photodiode generates a photocurrent which starts to integrated charge at the gate of a source-follower/buffer amplifier M2. At the end of an image capture, select transistor M3 is enabled to provide an output voltage which is dependent on the amount of charge stored at the gate of transistor M2.

FIG. 2 shows an array 5 of pixels 10, each pixel 10 being of the form just described. The pixels 10 are arranged in a grid of rows and columns. Pixels in each row are connected to a row select line 7. Row selection logic 6 controls signals applied to the set of row SELECT lines 7. Each column of pixels 10 in the array 5 is connected by a column output line 9. In use, rows are selected, one at a time, by enabling respective select lines 7, and the voltage of each pixel in the selected row is output to a respective column output line 9 for processing 8.

In order to be able to fabricate large area CMOS image sensors, the pixels have to be designed with a low sensitivity to defects that occur on the wafer. One type of defect which is particularly problematic is where a row select line 7 erroneously connects to a supply line (VDD), as shown by link 13, or where a row select line 7 erroneously connects to a column output line 9, in region 14. These errors can result from defects in the fabrication process. Defect 13 causes an entire row of pixels 10 to be permanently selected and prevents other rows from being read out. Consequently, the entire array 5 cannot be used. Defect 14 also causes the entire row of pixels to be permanently selected, because column output line will be tied to a high voltage during operation. This prevents the other rows from being read out. Consequently, also for this defect, the entire array can not be used.

One known solution to reduce this problem is described in US2005/051775 and shown in FIG. 3. Two select transistors M4, M5 are arranged in series between transistor M2 and column output line 9. Two row select lines are provided (select line 1, select line 2). Each select transistor M4, M5 is connected to a different one of the row select lines. Now, even if one of the select lines is erroneously connected to supply line VDD, as shown by defect 13, the row will not be selected until the other select line is enabled. This scheme requires one additional transistor per pixel and one additional control line. However, a defect which shorts both select lines to the supply line, shown as 15, will still render the array non-operational. Such double short errors can occur at large defects on a wafer, such as defects of a few microns in size.

The present invention seeks to provide an alternative way of minimising the effects of defects in a pixel array.

SUMMARY OF THE INVENTION

A first aspect of the present invention provides an array of active pixels comprising rows of active pixels and row select lines for selecting rows of active pixels, wherein each active pixel comprises:

a photo-sensitive element;

a buffer amplifier for buffering an output of the photo-sensitive element, the buffer amplifier having an input and an output;

a first switch connected to the output of the buffer amplifier, responsive to a row select line, for selecting the pixel;

and wherein the output of the buffer amplifier can be selectively put into a high impedance state by control of the input of the buffer amplifier when there is a defect in the row select line for that pixel.

By putting the buffer amplifier (also known in some types of pixel sensors as a source-follower) into a high impedance state, that pixel is disabled. Other pixels in the same row will be similarly disabled. This allows other rows, which are defect-free, to remain operating as normal. This increases the yield of devices on a wafer, as devices with this type of defect can still be used.

One way of putting the buffer amplifier into a high impedance state is to provide a disable line for a row of pixels. Each pixel comprises a second switch having an input connected to the disable line. The second switch is operable in: a first state, in which the buffer amplifier is allowed to operate as a buffer amplifier; and, a second state in which the second switch ties the input of the buffer amplifier to ground, or a low voltage supply line. A disable line can be provided per row of pixels or a disable line can be provided for multiple (at least two) rows of pixels, with all pixels on the multiple rows sharing that disable line. This has an advantage of reducing the number of control lines in the array, but has a penalty that, in the case of a defect, the multiple rows of pixels sharing the disable line will be rendered non-operational. This can be concealed by suitable error-correction techniques, such as calculating values for the non-operational pixels by an interpolation calculation using pixel data values of operational lines.

Another way of putting the buffer amplifier into a high impedance state provides a first supply line for supplying a voltage to a row of pixels. Each pixel comprises a reset switch connected between the photo-sensitive element and the first supply line for resetting the photo-sensitive element. The array is configured such that, in the event of a defect in a row select line, the first supply line is set to ground, or a low voltage, and the reset switch is turned on to put the buffer amplifier into the high impedance state.

The buffer amplifier buffers an output of a photo-sensitive element. The input of the buffer amplifier can be connected directly to the photo-sensitive element as, for example, in a 3T pixel. Alternatively, the input of the buffer amplifier can be connected to a sense node (floating diffusion), with charge being transferred from the photo-sensitive element to the sense node via a transfer switch as, for example, in a 4T pixel. Alternatively, the input of the buffer amplifier can be connected to a memory element that stores a signal inside the pixel, representative of a previous exposure period to which the photo-sensitive element was exposed.

Preferably there is a separate, second supply line, for powering the buffer amplifier in each of a plurality of pixels, such as a column of pixels.

Advantageously, the array further comprises a test module for testing for defects in row select lines.

Advantageously, the array further comprises a store for storing a list of rows in which defects are present.

The defect can comprise one or more of: a row select line shorted to a voltage supply line; a row select line shorted to a control line for the same, or a different, pixel; a row select line shorted to a pixel output line; an open connection on a row select line.

Advantageously, the array further comprises an error concealing module arranged to generate pixel data for the pixels that have been put into a high impedance state. This can use an interpolation function using pixel data from other pixels.

The pixel array is preferably manufactured using a CMOS semiconductor process and can be applied to pixels in which NMOS, or PMOS, transistors are used as the buffer amplifier.

A further aspect of the invention provides a method of controlling an array of active pixels comprising rows of active pixels and row select lines for selecting rows of active pixels, each pixel comprising a buffer amplifier for buffering an output of a photo-sensitive element within the pixel, the method comprising:

selectively putting an output of the buffer amplifier in a pixel into a high impedance state when there is a defect in the row select line for that pixel by control of the input of the buffer amplifier.

Throughout this specification, it should be noted that the term "row" and "column" can be interchanged. Also, the term "row" does not imply a particular orientation of the array.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
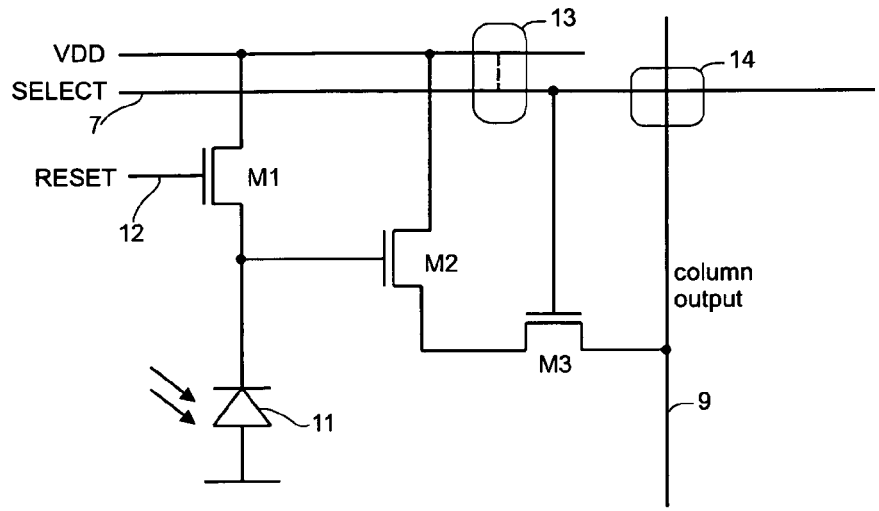
FIG. 1 shows a known three-transistor active pixel.
Figure 2:
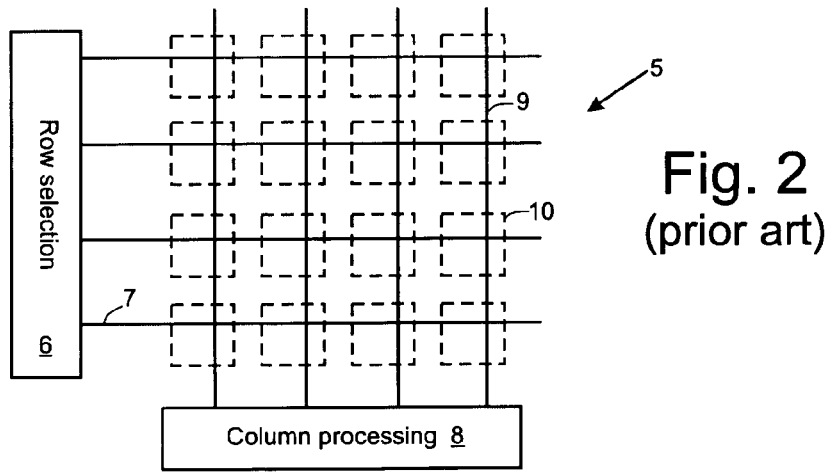
FIG. 2 shows a pixel array.
Figure 3:
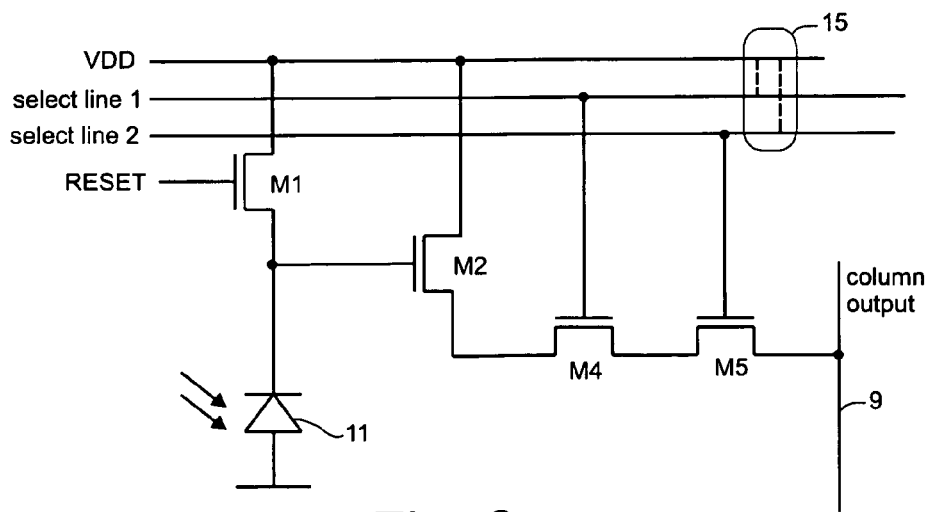
FIG. 3 shows a prior art solution for defects affecting select lines in a pixel array.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 4:
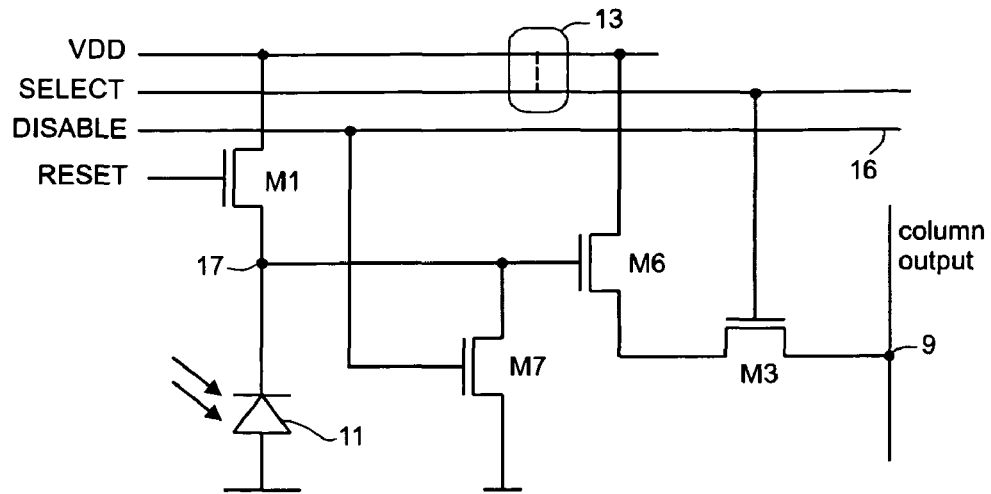
FIG. 4 shows an active pixel according to a first embodiment of the present invention in which a disable line and an additional transistor are used to put the buffer amplifier into a high impedance state.

FIG. 4 shows an active pixel in accordance with a first embodiment of the invention. Photodiode 11, reset transistor M1 and select transistor M3 have the same functions as for a conventional 3T active pixel shown in FIG. 1 and described earlier. Transistor M6 performs the same function as source-follower/buffer amplifier M2 when there is no defect in the select line to the row of pixels. The pixel of FIG. 4 is modified to include an additional line DISABLE and transistor M7. Transistor M7 is connected between ground and node 17 at the cathode of the photodiode 11. The gate of transistor M7 is connected to the DISABLE line. In the event of a defect 13, which shorts the SELECT line to the supply line VDD, or the pixel output line 9, source-follower/buffer amplifier transistor M6 is used as a switch. A high voltage is applied to the DISABLE line for that row of pixels. This causes transistor M7 to switch on, and pulling transistor M6 into a high impedance state. This prevents any voltage from being output to line 9. This allows all remaining, non-defect, rows of the array to be used.

The defect can be: a short of the SELECT line to VDD or a high potential; a short of the SELECT line to a pixel control line used to control this pixel or pixels of a different row or column; a short of the SELECT line to a pixel output line 9; an open connection on the SELECT line, making part of the SELECT line, or the entire SELECT line, high impedance and hence uncontrollable.

Figure 5:
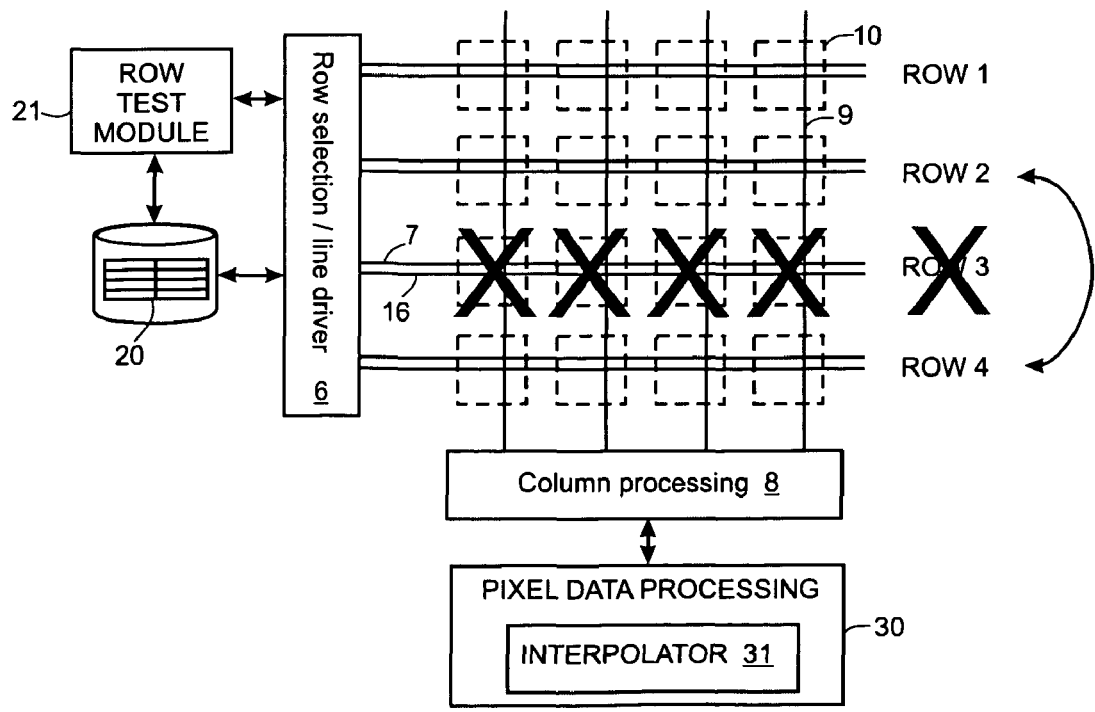
FIG. 5 shows a pixel array having a defective select line on one of the rows of pixels.

Defect rows can be identified during a test of the image sensor, performed during a production test executed at the image sensor manufacturer at the time of manufacture, or during a self-check function of the image sensor, such as a test performed when the host device (typically a camera) is first powered on. Referring to FIG. 5, the production test or self-test generates a list or 'map' of defective lines which, in turn, indicates which rows of pixels cannot be used. This list of defect lines/rows is stored 20 at the array. After the self-test, the lines in the defect line map are configured to be disabled. Several algorithms are possible to detect defect lines. One implementation works as follows: at first, all lines are disabled except one, and the test verifies if the non-disabled line is operational. If the line is not responsive, it is added to the defect line map. This process is repeated for all lines, one by one. After testing all lines, the defect line map is complete. The peripheral circuits that control the pixel array, such as row selection logic 6, contain circuitry to put the various control lines of a defective pixel row to the required voltage levels at all time during operation. Furthermore, these circuits can contain extra circuitry to support the detection of defect rows; this is shown as a row test module 21. When the image sensor is operated, these defect rows are disabled by keeping the row DISABLE line 16 high permanently during the operation of the sensor. As long as the row DISABLE lines are high, the pixel source-followers/buffer amplifier M6 of that row are connected to GND at the gate, which keeps the source of the source follower at a high impedance. Because of this high impedance, the defect on the SELECT line can not disturb the readout of the other rows of the pixel array. The row in which the defect occurred will be missing from the overall image. In FIG. 5, row 3 has a defect and is disabled and unusable. In general, missing rows can be accepted in large area and high resolution image sensors, and the missing row is concealed by using an interpolation algorithm to generate pixel data for the disabled row. In FIG. 5, the outputs of row 2 and row 4 can be interpolated to provide pixel data for the disabled row 3. Any suitable interpolation algorithm can be used. Interpolation is performed by an interpolator module 31 within the pixel data processing function 30, or as part of a later processing stage.

A further advantage of this method is that a short between both the DISABLE line 16 and the supply line VDD or column output line 9, and between the SELECT line and the supply line VDD or column output line 9 will result in a defect line, but the sensor will still be operational. The array can be said to "fail-safe" as the defect condition of a high voltage being applied to the disable line 16 causes transistor M7 to operate and put transistor M6 into a high impedance state, which is the same result as if transistor M7 were actively disabled.

The scheme shown in FIG. 4 will incur a small leakage current through the disable transistor M7 when the disable transistor M7 is turned off (normal, non-defective pixel operation). The leakage current can be reduced by making the gate-to-source voltage difference negative. The leakage reduces exponentially with this voltage difference. In some processes, or when the transistor has a very small length, the leakage may be too high with a gate-to-source voltage of 0V and so it is advantageous to provide a negative gate-to-source voltage across transistor M7. This can be achieved by connecting the source of the disable transistor M7 to a higher voltage (than ground) for non-defect rows. For this purpose, a low DC voltage needs to be distributed to the pixels by horizontal or vertical metal lines. This DC voltage should be well below the threshold voltage of the NMOS buffer amplifier M6, in order to keep the buffer amplifier M6 in a high impedance state. The leakage current can also be mitigated by applying a negative voltage to the DISABLE line for the operational (non-defect) pixel rows. Such negative voltage is supplied by the driver logic 6 which controls the DISABLE line, and which is present in the peripheral circuits at the left or right side of the array. These shortcomings are overcome in the embodiment shown in FIG. 6.

Figure 6:
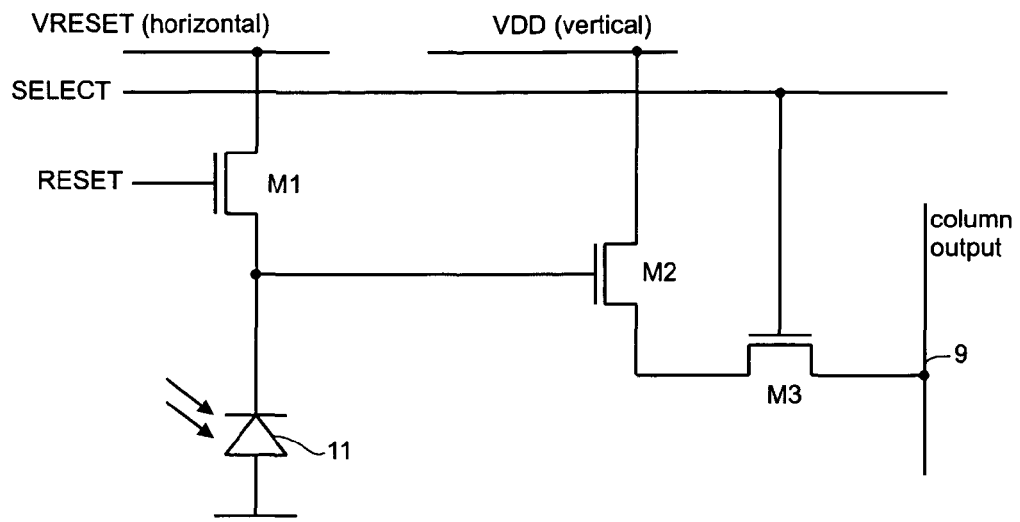
FIG. 6 shows a second embodiment of an active pixel in which a supply line can be set to a low voltage to put the buffer amplifier into a high impedance state.

Before referring to the embodiment of FIG. 6, it is helpful to consider again a conventional 3T active pixel, shown in FIG. 1. It has a single VDD line which is used to power both the buffer amplifier M2 and the reset switch M1. VDD is typically routed vertically (i.e. aligned with a column) to avoid resistive voltage drops and it is shared by all pixels of the same column, although typically only one pixel of each column is read out at a time, so the current through the line is limited. There is also one, individually controllable, VRESET control line per row of pixels. FIG. 6 shows a three transistor (3T) active pixel with elements as previously described. If the row is defective because of a short on the SELECT line, the gate of the buffer amplifier/source-follower transistor M2 is connected to GND, or more generally, a potential low enough to put the source-follower transistor M2 output at a high impedance. The power supply for the pixel source-follower M2 is supplied via a vertical line tied to VDD. The reset voltage for the reset of the pixels is supplied via the horizontal VRESET line (parallel to the reset and select lines in the pixel). When the SELECT line is shorted to VDD, or to the pixel output 9, the VRESET line is kept at 0V for this defect row, and the RESET line of the defect row is permanently kept at VDD. The reset transistor M1 is conducting with these signal levels, and the photodiodes 11 of this row are permanently tied to GND(=VRESET). This means that the source-follower will be high impedance at its output, and the defect SELECT line will not disturb the readout of the other lines of the array.

This method has the advantage of only requiring one additional horizontal control line (VRESET), and no extra transistors compared to the standard 3T active pixel. If VRESET is tied to VDD by accident, the line is still functional and this does not even give rise to a defect since, in normal operation, VRESET is required to be at VDD.

For pixel arrays with a low number of columns, the horizontal VRESET line can be used to also power the buffer amplifier M2, and no separate vertical VDD line is required. In that case, the embodiment of FIG. 6 can even be used without any extra routing, or transistors, inside the pixel compared to the standard 3T pixel. It is still necessary for the selection logic 6 to set the VRESET line 'low' to cause the row to be disabled.

Figure 7:
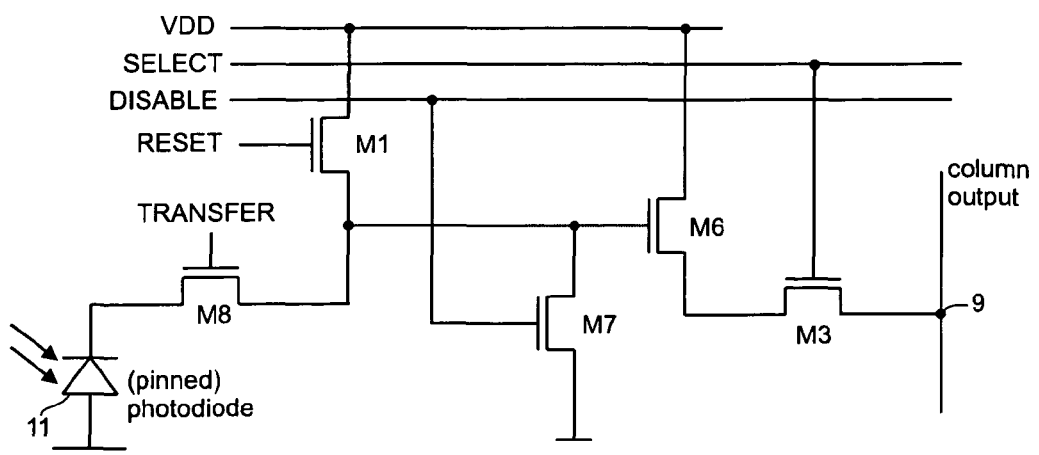
FIGS. 7 and 8 show embodiments of the invention using charge transfer pixels, which follow the principles of FIGS. 4 and 6.

The methods described above can also be used with other pixel configurations. A popular configuration is a 4-transistor (4T) pixel, also called a charge transfer pixel, or pinned diode pixel. In such a pixel, the charge is transferred from a photodiode to a sense node (also called "floating diffusion"). The reset transistor and source-follower are connected to this floating diffusion. FIG. 7 shows an embodiment of the invention applied to a 4T pixel. In a similar manner to FIG. 4, there is a separate DISABLE line and a disable transistor M7. The charge transfer pixel has an additional transfer transistor M8, which is a conventional part of this type of pixel. This invention can improve the yield of sensors with this pixel type, by forcing the floating diffusion to 0V (or a low voltage) when a defect causes the SELECT line to be shorted to the supply line VDD. Another pixel configuration which the invention can be used with is a configuration where the pixel includes a memory element which stores a signal inside the pixel, representative of a previous exposure period to which the photosensitive element was exposed. The input of the buffer amplifier is connected to the memory element.

Figure 8:
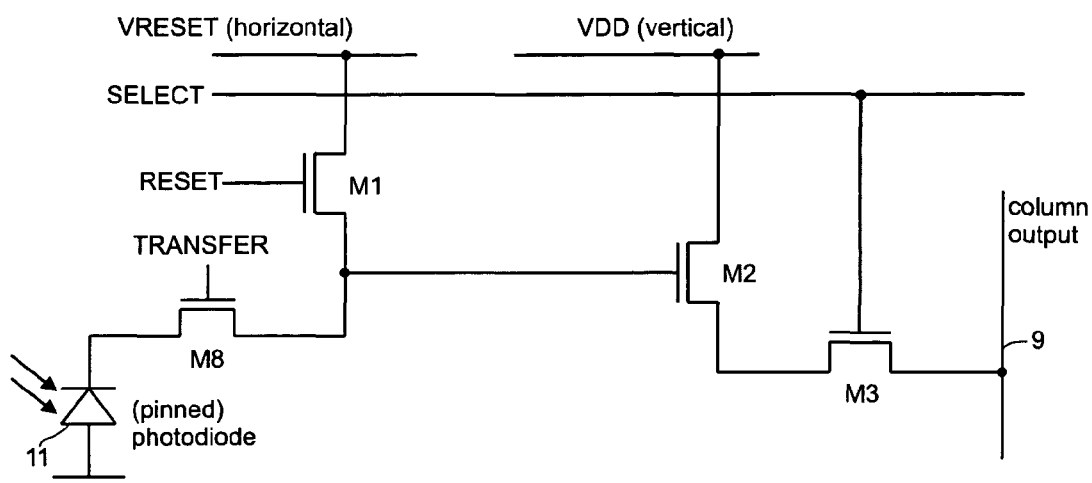

FIG. 8 shows a further embodiment of a charge transfer pixel which forces a low voltage on a defect row of transistors through the reset transistor M1, in a similar manner to FIG. 6.

The principles of the present invention can also applied to other types of pixels which use a higher number of transistors per pixel, such as synchronous shutter pixels.

The invention is not limited to the embodiments described herein, which may be modified or varied without departing from the scope of the invention.

The invention claimed is:

1. An array of active pixels comprising rows of active pixels and row select lines for selecting rows of active pixels, wherein each active pixel comprises:
   a photo-sensitive element;
   a buffer amplifier for buffering an output of the photo-sensitive element, the buffer amplifier having an input and an output;
   a first switch connected to the output of the buffer amplifier, responsive to a row select line, for selecting the pixel;
and wherein the output of the buffer amplifier is selectively controllable so as to be put into a high impedance state by control of the input of the buffer amplifier when there is a defect in the row select line for that pixel.

2. An array according to claim 1 further comprising a disable line for a row of pixels and wherein each pixel further comprises a second switch having an input connected to the disable line, the second switch being operable in:
   a first state, in which the buffer amplifier is allowed to operate as a buffer amplifier; and,
   a second state in which the second switch ties the input of the buffer amplifier to ground, or a low voltage supply line.

3. An array according to claim 2 further comprising a disable line driver which is arranged to set the disable line high to put the switch into the second state.

4. An array according to claim 3 wherein the disable line driver is arranged to set the disable line at a negative voltage during the first state.

5. An array according to claim 2 wherein a disable line is shared by a plurality of rows of pixels.

6. An array according to claim 1 further comprising a first supply line for supplying a voltage to a row of pixels and wherein each pixel further comprises a reset switch connected between the input of the buffer amplifier and the first supply line, wherein the array is configured such that, in the event of a defect in a row select line, the first supply line is set to ground, or a low voltage, and the reset switch is turned on to put the output of the buffer amplifier into the high impedance state.

7. An array according to claim 6 further comprising a second supply line for powering the buffer amplifier in each of a plurality of pixels.

8. An array according to claim 7 wherein the second supply line is provided for powering the buffer amplifier in each of a column of pixels.

9. An array according to claim 6 wherein the first supply line is also arranged to power the buffer amplifier.

10. An array according to claim 1 further comprising a test module for testing for defects in row select lines.

11. An array according to claim 1 further comprising a store for storing a list of rows in which defects are present.

12. An array according to claim 11 further comprising driving circuitry for driving lines of rows where a defect is present to put the buffer amplifier into a high impedance state.

13. An array according to claim 1 wherein the defect is any one of: a row select line shorted to a voltage supply line; a row select line shorted to a pixel control line; a row select line shorted to a pixel output line; an open connection on a row select line.

14. An array according to claim 1 further comprising an error concealing module arranged to generate pixel data for the pixels that have been put into a high impedance state.

15. An array according to claim 14 wherein the error-concealing module is arranged to generate pixel data or the pixels that have been put into a high impedance state by using an interpolation function using pixel data from other pixels.

16. An array according to claim 1 fabricated in CMOS technology.

17. A method of controlling an array of active pixels comprising rows of active pixels and row select lines for selecting rows of active pixels, each pixel comprising a buffer amplifier for buffering an output of a photo-sensitive element within the pixel, the buffer amplifier having an input and an output, the method comprising:

selectively putting an output of the buffer amplifier in a pixel into a high impedance state when there is a defect in the row select line for that pixel by control of the input of the buffer amplifier.

* * * * *